(12) United States Patent
Nagashima

(10) Patent No.: US 12,454,923 B2
(45) Date of Patent: Oct. 28, 2025

(54) INTAKE AND EXHAUST SYSTEM

(71) Applicant: SUBARU CORPORATION, Tokyo (JP)

(72) Inventor: Hiroki Nagashima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/918,540

(22) Filed: Oct. 17, 2024

(65) Prior Publication Data

US 2025/0146450 A1    May 8, 2025

(30) Foreign Application Priority Data

Nov. 6, 2023 (JP) ................. 2023-189658

(51) Int. Cl.
*F02D 41/02* (2006.01)
*F02D 41/00* (2006.01)

(52) U.S. Cl.
CPC ..... *F02D 41/0255* (2013.01); *F02D 41/0007* (2013.01); *F02D 41/0055* (2013.01); *F02D 2200/08* (2013.01)

(58) Field of Classification Search
CPC .......... F01N 3/2013; F01N 3/323; F01N 3/22; F01N 2240/16; F01N 2900/1602; F01N 2900/1626; F02D 41/0255; F02D 41/0007
See application file for complete search history.

(56) References Cited

U.S. PATENT DOCUMENTS

2010/0199638 A1    8/2010  Yoshikawa

FOREIGN PATENT DOCUMENTS

| JP | 2010-185325 A1 | 8/2010 | |
| JP | 2011163348 A | * 8/2011 | |
| WO | WO-2023192615 A1 | * 10/2023 | ............. F01N 3/027 |

* cited by examiner

*Primary Examiner* — Ngoc T Nguyen
(74) *Attorney, Agent, or Firm* — TROUTMAN PEPPER LOCKE LLP

(57) ABSTRACT

An intake and exhaust system includes an engine, an exhaust flow passage, a catalyst, and a control apparatus. The exhaust flow passage is coupled to the engine. The catalyst is disposed in the exhaust flow passage and configured to purify exhaust gas. The control apparatus includes one or more processors, and one or more memories coupled to the one or more processors. The one or more processors are configured to: before the engine is started up, execute scavenging control that causes the exhaust gas remaining in the engine and the exhaust flow passage to flow to pass through the catalyst before being discharged; and before the engine is started up, execute warming control that warms up the catalyst, based on a degree of purification of the exhaust gas by the catalyst during execution of the scavenging control.

18 Claims, 5 Drawing Sheets

INTAKE AND EXHAUST SYSTEM

CROSS-REFERENCE TO RELATED APPLICATION

The present application claims priority from Japanese Patent Application No. 2023-189658 filed on Nov. 6, 2023, the entire contents of which are hereby incorporated by reference.

BACKGROUND

The disclosure relates to an intake and exhaust system.

A catalyst that purifies exhaust gas is disposed in an exhaust flow passage coupled to an engine. Japanese Unexamined Patent Application Publication No. 2010-185325, for example, discloses a nitrogen oxide occlusion catalyst to be disposed in an exhaust flow passage.

SUMMARY

An aspect of the disclosure provides an intake and exhaust system including an engine, an exhaust flow passage, a catalyst, and a control apparatus. The exhaust flow passage is coupled to the engine. The catalyst is disposed in the exhaust flow passage and configured to purify exhaust gas. The control apparatus includes one or more processors, and one or more memories coupled to the one or more processors. The one or more processors are configured to: before the engine is started up, execute scavenging control that causes the exhaust gas remaining in the engine and the exhaust flow passage to flow to pass through the catalyst before being discharged; and before the engine is started up, execute, warming control that warms up the catalyst, based on a degree of purification of the exhaust gas by the catalyst during the execution of the scavenging control.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

Figure 1:
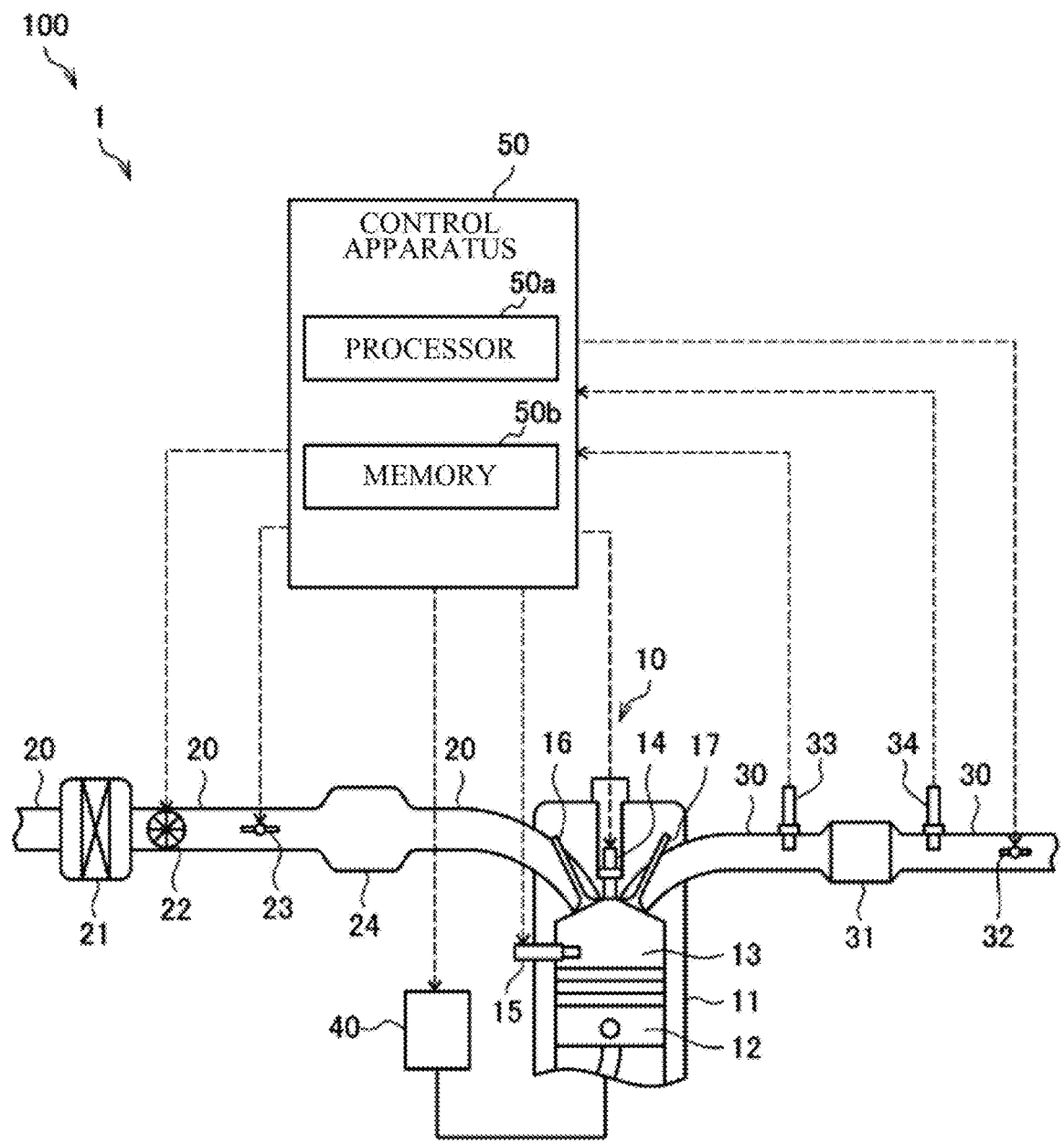
FIG. 1 is a schematic diagram illustrating an exemplary configuration of an intake and exhaust system according to one example embodiment of the disclosure.

To cause a catalyst disposed in an exhaust flow passage to effectively exhibit a purifying effect, the catalyst is to be warmed up to an elevated temperature. However, unnecessary warming-up of the catalyst whose temperature has not been sufficiently decreased, for example, can cause deterioration in environmental performance or fuel efficiency. It is therefore desired to warm up the catalyst at an appropriate timing.

It is desirable to provide an intake and exhaust system that makes it possible to warm up a catalyst at an appropriate timing.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

An intake and exhaust system 1 according to an example embodiment of the disclosure will now be described with reference to FIGS. 1 and 2.

FIG. 1 illustrates a schematic configuration of the intake and exhaust system 1. The intake and exhaust system 1 may be mounted in a vehicle 100. Referring to FIG. 1, the intake and exhaust system 1 may include an engine 10, an intake flow passage 20, an exhaust flow passage 30, a starter motor 40, and a control apparatus 50. The vehicle 100 may be an engine-driven vehicle including the engine 10 as a power source. In some embodiments, the vehicle 100 may be a hybrid vehicle including the engine 10 and a traveling motor as power sources.

The engine 10 may be a spark-ignition internal combustion engine, for example. The engine 10 may include one or more cylinders 11. To facilitate understanding, FIG. 1 simply illustrates one of the cylinders 11 of the engine 10. The cylinder 11 may be provided with a piston 12 in a slidable manner. Inside the cylinder 11, a combustion chamber 13 may be formed. The combustion chamber 13 may be defined by an inner face of the cylinder 11 and a top face of the piston 12. The cylinder 11 may be further provided with an ignition plug 14 facing the combustion chamber 13. The cylinder 11 may be further provided with a fuel injection valve 15 that ejects fuel into the combustion chamber 13. In the combustion chamber 13, an air-fuel mixture including air and fuel may be generated. The air-fuel mixture may be ignited and burned by the ignition plug 14. This may cause linear reciprocating movement of the piston 12 in each cylinder 11, transmitting power to a crank shaft coupled to each piston 12.

The fuel injection valve 15 is not limited to a fuel injection valve that ejects the fuel directly into the combustion chamber 13. In some embodiments, the fuel injection valve 15 may be disposed in the intake flow passage 20 and eject the fuel into the intake flow passage 20. In this case, the fuel may be injected together with intake air into the combustion chamber 13. The fuel supplied to the fuel injection valve 15 may be, for example, gasoline. However, the fuel supplied to the fuel injection valve 15 may be any fuel other than gasoline.

Each combustion chamber 13 in the engine 10 may be communicated with the intake flow passage 20 via an intake port, and may be communicated with the exhaust flow passage 30 via an exhaust port. Each cylinder 11 may be provided with an intake valve 16 and an exhaust valve 17. The intake valve 16 may be configured to open and close the intake port. The exhaust valve 17 may be configured to open and close the exhaust port. When the intake valve 16 and the exhaust valve 17 are driven, the intake air may be supplied to the combustion chamber 13, and exhaust gas may be discharged from the combustion chamber 13.

The intake flow passage 20 may be coupled to the engine 10. The air to be supplied to the combustion chamber 13 of the engine 10 may flow in the intake flow passage 20. The intake flow passage 20 may have a non-illustrated intake port on its upstream end. The air outside the vehicle 100 may be taken into the intake flow passage 20 through the intake port.

The intake flow passage 20 may be further provided with an air filter 21 disposed downstream the intake port. The air filter 21 may remove foreign matter included in the air flowing in the intake flow passage 20.

The intake flow passage 20 may be further provided with an electric compressor 22 disposed downstream the air filter 21. The electric compressor 22 may be driven with electric power, compress the air, and discharge the compressed air to the downstream side.

The intake flow passage 20 may be further provided with a throttle valve 23 disposed downstream the electric compressor 22. The throttle valve 23 may adjust the amount of the intake air flow to be sent to the engine 10 through the intake flow passage 20. The amount of the intake air flow sent to the engine 10 may vary depending on the opening of the throttle valve 23. The throttle valve 23 may be configured to open and close the intake flow passage 20. Opening the throttle valve 23 may allow the gas to flow to pass through the position of the throttle valve 23 disposed in the intake flow passage 20. Closing the throttle valve 23 may prevent the gas from flowing to pass through the position of the throttle valve 23 disposed in the intake flow passage 20. The throttle valve 23 may be, for example but not limited to, a butterfly valve.

The intake flow passage 20 may be further provided with a surge tank 24 disposed downstream the throttle valve 23. The surge tank 24 may temporarily hold the intake air to be sent to the engine 10.

The intake flow passage 20 may be further provided with a non-illustrated intake manifold disposed downstream the surge tank 24. The intake manifold may branch to the cylinders 11 of the engine 10 and may be coupled to the intake port of each cylinder 11.

The outside air may be taken into the intake flow passage 20 through the intake port. The air taken into the intake flow passage 20 may flow to pass through the air filter 21 and then flow to pass through the electric compressor 22, the throttle valve 23, and the surge tank 24 in this order to the engine 10.

The exhaust flow passage 30 may be coupled to the engine 10. The exhaust gas discharged from the combustion chamber 13 of the engine 10 may flow in the exhaust flow passage 30. The exhaust flow passage 30 may have a non-illustrated exhaust port on its downstream end. The exhaust gas may be discharged to outside the vehicle 100 through the exhaust port.

The exhaust flow passage 30 may be further provided with a non-illustrated exhaust manifold. The exhaust manifold may branch to the cylinders 11 of the engine 10 and may be coupled to the exhaust port of each cylinder 11.

The exhaust flow passage 30 may be further provided with a catalyst 31 disposed downstream the exhaust manifold. The catalyst 31 may be, for example but not limited to, a nitrogen oxide occlusion catalyst capable of occluding NOx included in the exhaust gas. In examples described below, the catalyst 31 may be the nitrogen oxide occlusion catalyst. However, the catalyst 31 is not limited to the nitrogen oxide occlusion catalyst described below.

The exhaust flow passage 30 may be further provided with an on-off valve 32 disposed downstream the catalyst 31. The on-off valve 32 may be configured to open and close the exhaust flow passage 30. Opening the on-off valve 32 may allow the gas to flow to pass through the position of the on-off valve 32 disposed in the exhaust flow passage 30. Closing the on-off valve 32 may prevent the gas from flowing to pass through the position of the on-off valve 32 disposed in the exhaust flow passage 30. In the example illustrated in FIG. 1, the on-off valve 32 may be a butterfly valve. In some embodiments, the on-off valve 32 may be any valve other than the butterfly valve.

The exhaust gas discharged from the engine 10 to the exhaust flow passage 30 may flow to pass through the catalyst 31 while being purified by the catalyst 31, flow to pass through the on-off valve 32, and be discharged through the exhaust port.

The exhaust flow passage 30 may be further provided with a first exhaust gas sensor 33 and a second exhaust gas sensor 34. The first exhaust gas sensor 33 may be disposed upstream the catalyst 31 in the exhaust flow passage 30. The first exhaust gas sensor 33 may detect the concentration of each composition of the exhaust gas flowing into the catalyst 31. The second exhaust gas sensor 34 may be disposed downstream the catalyst 31 in the exhaust flow passage 30. The second exhaust gas sensor 34 may detect the concentration of each composition of the exhaust gas flowing from the catalyst 31. In the example illustrated in FIG. 1, the second exhaust gas sensor 34 may be disposed upstream the on-off valve 32 in the exhaust flow passage 30. In some embodiments, the second exhaust gas sensor 34 may be disposed downstream the on-off valve 32 in the exhaust flow passage 30.

The first exhaust gas sensor 33 and the second exhaust gas sensor 34 may detect the concentration of NOx in the exhaust gas, for example. In some embodiments, the first exhaust gas sensor 33 and the second exhaust gas sensor 34 may detect the concentration of a composition of the exhaust gas other than NOx, as described below.

The starter motor 40 may be coupled to the engine 10. The starter motor 40 may be used to start up the engine 10. In some embodiments, the starter motor 40 may have an output shaft coupled to the crank shaft of the engine 10 via a gear so that the power transmitted from the starter motor 40 is sent to the crank shaft of the engine 10. The starter motor 40 may be driven with electric power.

The control apparatus 50 includes one or more processors 50a and one or more memories 50b coupled to the one or more processors 50a. The one or more processors 50a may each include a central processing unit (CPU), for example. The one or more memories 50b may include a read only memory (ROM) or a random access memory (RAM), for example. The ROM may be a storage device that holds data such as programs and operation parameters to be used by the CPU. The RAM may be a storage device that temporarily holds data such as variables and parameters usable for processing to be executed by the CPU.

The control apparatus 50 may communicate with each device in the intake and exhaust system 1. The communication between the control apparatus 50 and the devices may be established via a communication network such as a controller area network (CAN).

Figure 2:
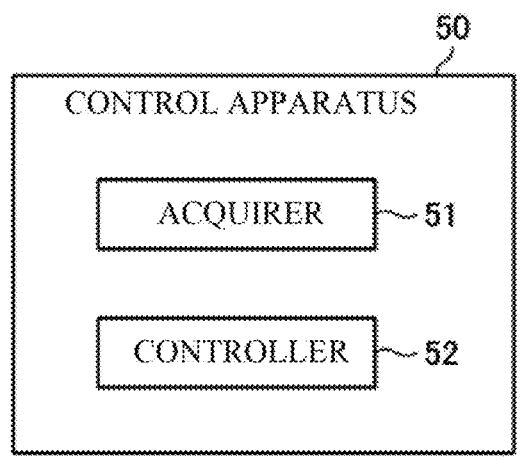
FIG. 2 is a block diagram illustrating an exemplary configuration of a control apparatus in the intake and exhaust system illustrated in FIG. 1.

FIG. 2 is a block diagram illustrating an exemplary configuration of the control apparatus 50. In the example illustrated in FIG. 2, the control apparatus 50 may include an acquirer 51 and a controller 52.

Various kinds of processing including later-described processes to be performed by the acquirer 51 and the controller 52 may be executed by the processor 50*a*. In some embodiments, the various kinds of processing may be executed when the processor 50*a* carries out the programs stored in the memory 50*b*, for example.

The functionality of the control apparatus 50 according to the present example embodiment may be implemented by a plurality of devices, or multiple functionalities of the control apparatus 50 may be implemented by a single device. When the functionality of the control apparatus 50 is implemented by a plurality of devices, the devices may be coupled to each other via a communication bus such as a CAN.

The acquirer 51 may acquire various kinds of data to be used in the process to be performed by the controller 52, and send the data to the controller 52. In some embodiments, the acquirer 51 may acquire the data from the first exhaust gas sensor 33 and the second exhaust gas sensor 34.

The controller 52 may control an operation of each device in the intake and exhaust system 1 as follows. The controller 52 may control an ignition timing of the ignition plug 14. The controller 52 may control a fuel-injection timing and an amount of fuel injection through the fuel injection valve 15. The amount of fuel injection may be the amount of fuel to be supplied to the engine 10. The controller 52 may control an operation of the electric compressor 22. The controller 52 may control the opening of the throttle valve 23. The controller 52 may control the opening of the on-off valve 32. The controller 52 may control an operation of the starter motor 40.

An exemplary operation of the intake and exhaust system 1 according to the example embodiment of the disclosure will now be described with reference to FIG. 3 to FIG. 6.

As described above, the exhaust gas in the intake and exhaust system 1 may be purified by the catalyst 31. To cause the catalyst 31 to effectively exhibit the purifying effect, the catalyst 31 is to be warmed up to an elevated temperature. The control apparatus 50 may be thus configured to execute warming control that warms up the catalyst 31. The warming control will be described in detail later.

Before the engine 10 is started up, the control apparatus 50 in the intake and exhaust system 1 may execute scavenging control that causes the exhaust gas remaining in the engine 10 and the exhaust flow passage 30 to flow to pass through the catalyst 31 before being discharged, and execute the warming control, based on the degree of purification of the exhaust gas by the catalyst 31 during the execution of the scavenging control. The catalyst 31 may be thereby warmed up at an appropriate timing, as described below.

The scavenging control may be performed to identify the degree of purification of the exhaust gas by the catalyst 31. For this reason, in some embodiments, a large amount of exhaust gas may be caused to flow to pass through the catalyst 31 in the scavenging control. In this case, the control apparatus 50 may conduct a process of increasing the amount of exhaust gas flowing to pass through the catalyst 31 in the scavenging control after the engine 10 is stopped. An exemplary process to be performed by the control apparatus 50 after the engine 10 is stopped will now be described with reference to FIGS. 3 and 4.

Figure 3:
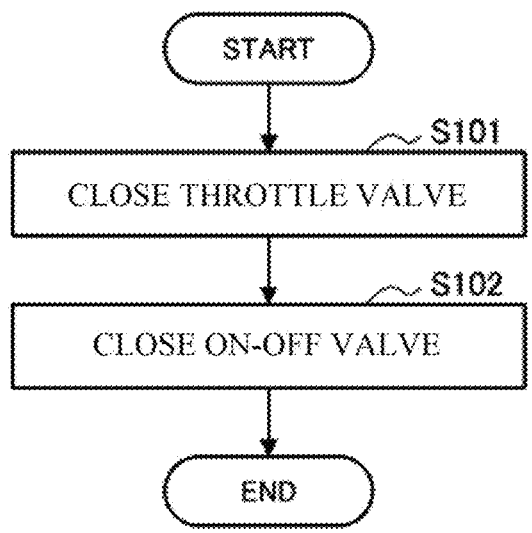
FIG. 3 is a flowchart of an exemplary process to be executed by the control apparatus illustrated in FIG. 2 after the engine is stopped.

FIG. 3 is a flowchart of the process to be performed by the control apparatus 50 after the engine 10 is stopped. The process flow illustrated in FIG. 3 may start when the ignition of the engine 10 is switched from ON to OFF, for example.

When the process flow illustrated in FIG. 3 starts, the controller 52 may first close the throttle valve 23 in Step S101. Thereafter, in Step S102, the controller 52 may close the on-off valve 32, following which the process flow illustrated in FIG. 3 ends.

Figure 4:
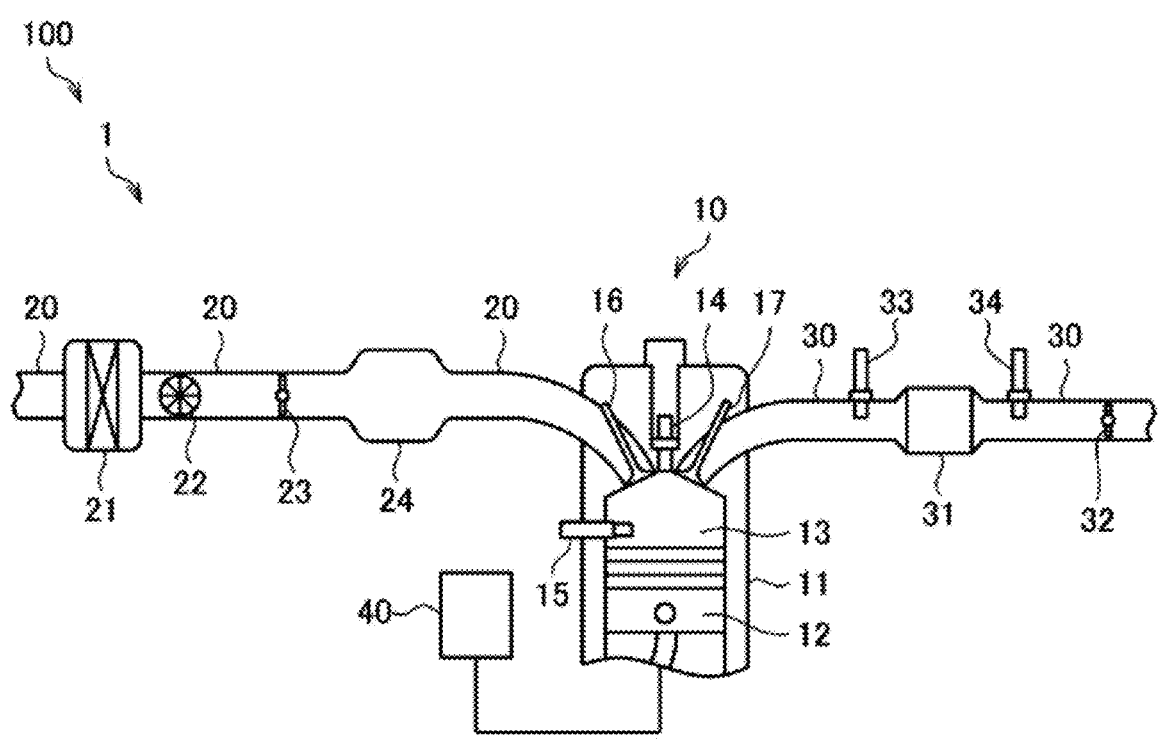
FIG. 4 is a diagram illustrating closed states of a throttle valve and an on-off valve in the intake and exhaust system illustrated in FIG. 1.

FIG. 4 illustrates closed states of the throttle valve 23 and the on-off valve 32 in the intake and exhaust system 1. As illustrated in FIG. 4, the throttle valve 23 and the on-off valve 32 may come into the closed state after the engine 10 is stopped. This may allow the exhaust gas remaining in the engine 10 and the exhaust flow passage 30 to stay remained in the space defined by the throttle valve 23 and the on-off valve 32 without being discharged to outside the vehicle 100. Causing the exhaust gas to stay remained in the engine 10 and the exhaust flow passage 30 after the engine 10 is stopped as described above makes it possible to increase the amount of the exhaust gas flowing to pass through the catalyst 31 in the scavenging control described below.

Next, an exemplary process to be performed by the control apparatus 50 before the engine 10 is started up will be described with reference to FIGS. 5 and 6.

Figure 5:
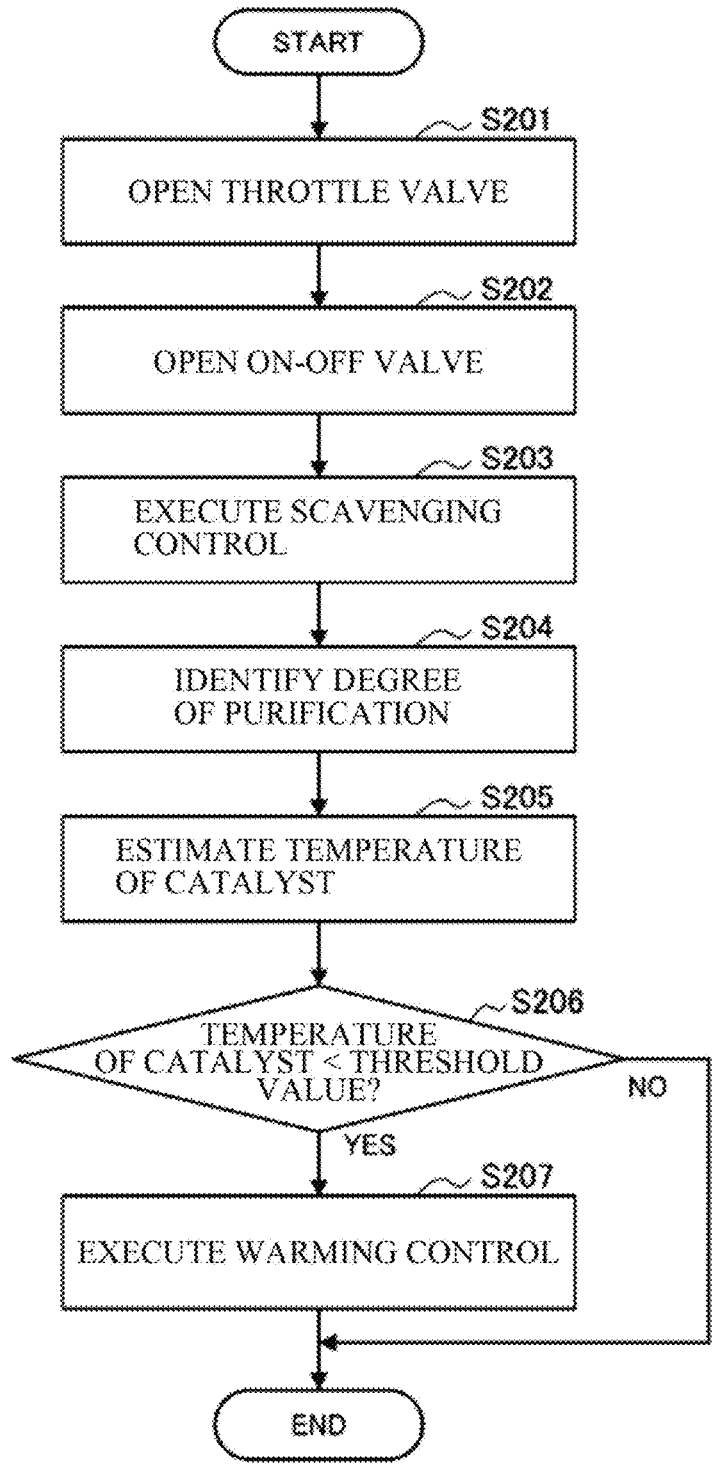
FIG. 5 is a flowchart of an exemplary process to be executed by the control apparatus illustrated in FIG. 2 before the engine is started up.

FIG. 5 is a flowchart illustrating the exemplary process to be performed by the control apparatus 50 before the engine 10 is started up. The process flow illustrated in FIG. 5 may start when the ignition of the engine 10 is switched from ON to OFF, for example.

When the process flow illustrated in FIG. 5 starts, the controller 52 may first open the throttle valve 23 in Step S201. Thereafter, in Step S202, the controller 52 may open the on-off valve 32.

Figure 6:
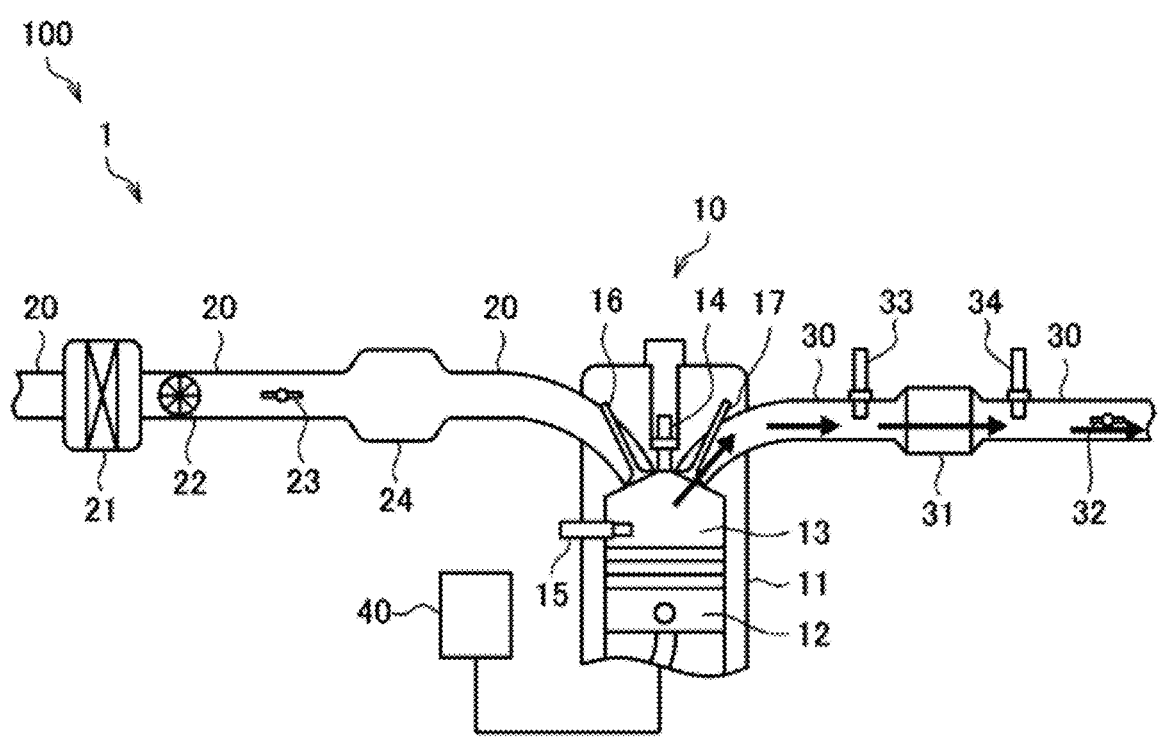
FIG. 6 is a diagram illustrating opened states of the throttle valve and the on-off valve in the intake and exhaust system illustrated in FIG. 1.

FIG. 6 illustrates opened states of the throttle valve 23 and the on-off valve 32 in the intake and exhaust system 1. As illustrated in FIG. 6, the throttle valve 23 and the on-off valve 32 may be in the opened states before the engine 10 is started up. This may allow the gas to flow in the intake flow passage 20, the engine 10, and the exhaust flow passage 30 from the upstream side to the downstream side.

After Step S202 in FIG. 5, the controller 52 may execute the scavenging control in Step S203. As described above, in the scavenging control, the exhaust gas remaining in the engine 10 and the exhaust flow passage 30 may be caused to flow to pass through the catalyst 31 before being discharged.

In some embodiments, the controller 52 may drive the starter motor 40 in the scavenging control to thereby cause the exhaust gas remaining in the engine 10 and the exhaust flow passage 30 to flow to pass through the catalyst 31 before being discharged. In this case, driving the starter motor 40 may cause the piston 12 to slide on each cylinder 11 of the engine 10, which drives the intake valve 16 and the exhaust valve 17. As a result, the gas may be caused to flow from the intake flow passage 20 to each cylinder 11 and from each cylinder 11 to the exhaust flow passage 30. Accordingly, as illustrated by arrows in FIG. 6, the exhaust gas remaining in the engine 10 and the exhaust flow passage 30 may be sent to the catalyst 31. The exhaust gas may flow to pass through the catalyst 31 and then be discharged through the exhaust port.

In some embodiments, the controller 52 may drive the electric compressor 22 in the scavenging control to thereby cause the exhaust gas remaining in the engine 10 and the exhaust flow passage 30 to flow to pass through the catalyst 31 before being discharged. In this case, the gas inside the intake flow passage 20 may be forcibly sent to the downstream side by the electric compressor 22. As a result, the gas may be caused to flow from the intake flow passage 20 to the exhaust flow passage 30 via the cylinder 11 where the intake valve 16 and the exhaust valve 17 are both in the opened states. Accordingly, as illustrated in the arrows in FIG. 6, the exhaust gas remaining in the engine 10 and the exhaust flow passage 30 may be sent to the catalyst 31. The exhaust gas may flow to pass through the catalyst 31 and then be discharged through the exhaust port.

In some embodiments, the controller 52 may drive both the starter motor 40 and the electric compressor 22 in the scavenging control. This appropriately causes the exhaust gas remaining in the engine 10 and the exhaust flow passage 30 to flow to pass through the catalyst 31 before being discharged. In some embodiments, the controller 52 may drive any one of the starter motor 40 or the electric compressor 22 in the scavenging control.

The controller 52 may drive any devices other than the starter motor 40 and the electric compressor 22 in the scavenging control. In some embodiments, the controller 52 may drive a blower disposed at a location, other than the intake flow passage 20, communicated with the intake flow passage 20 or the exhaust flow passage 30, in the scavenging control. In a case where the electric compressor 22 is not used in the scavenging control, the electric compressor 22 may be removed from the intake and exhaust system 1.

After Step S203 in FIG. 5, the controller 52 may identify, in Step S204, the degree of purification of the exhaust gas by the catalyst 31 during the execution of the scavenging control. The degree of purification may refer to the level of purifying effect of the catalyst 31 with respect to the exhaust gas, for example.

In Step S204, the controller 52 may identify the degree of purification, based on results of detection by the first exhaust gas sensor 33 and the second exhaust gas sensor 34 during the execution of the scavenging control, for example.

In some embodiments, the acquirer 51 may acquire the concentration of NOx in the exhaust gas flowing into the catalyst 31 during the execution of the scavenging control, based on the result of detection by the first exhaust gas sensor 33 during the execution of the scavenging control. Further, the acquirer 51 may acquire the concentration of NOx in the exhaust gas flowing from the catalyst 31 during the execution of the scavenging control, based on the result of detection by the second exhaust gas sensor 34 during the execution of the scavenging control. Thereafter, the controller 52 may identify the degree of purification described above, based on a comparison between the concentration of NOx in the exhaust gas flowing into the catalyst 31 during the execution of the scavenging control and the concentration of NOx in the exhaust gas flowing from the catalyst 31 during the execution of the scavenging control. In some embodiments, the controller 52 may determine that the degree of purification is lower as a difference or ratio between the concentration of NOx in the exhaust gas flowing into the catalyst 31 during the execution of the scavenging control and the concentration of NOx in the exhaust gas flowing from the catalyst 31 during the execution of the scavenging control is smaller.

After Step S204, the controller 52 may estimate, in Step S205, the temperature of the catalyst 31, based on the result of identification of the degree of purification of the exhaust gas by the catalyst 31 obtained in Step S204.

In some embodiments, data indicating a relation between the degree of purification of the exhaust gas by the catalyst 31 identified in Step S204 and the temperature of the catalyst 31 may be stored in the control apparatus 50 in advance. In Step S205, the controller 52 may estimate a temperature of the catalyst 31 corresponding to the degree of purification of the exhaust gas by the catalyst 31 identified in Step S204 as the temperature of the catalyst 31, referring to the data stored in the control apparatus 50. In some embodiments, the temperature of the catalyst 31 may decrease as the degree of purification of the exhaust gas by the catalyst 31 identified in Step S204 decreases. Accordingly, the controller 52 may determine that the temperature of the catalyst 31 is lower as the degree of purification of the exhaust gas by the catalyst 31 identified in Step S204 is lower.

To estimate the temperature of the catalyst 31 more accurately, the controller 52 may estimate the temperature of the catalyst 31, based on a degree of deterioration of the catalyst 31 in addition to the result of identification of the degree of purification of the exhaust gas by the catalyst 31 obtained in Step S204. In some embodiments, the controller 52 may determine that the degree of deterioration of the catalyst 31 is higher as the time of use of the catalyst 31 is longer. When the temperature of the catalyst 31 is constant, the degree of purification of the exhaust gas by the catalyst 31 may be lower as the degree of deterioration of the catalyst 31 is higher. Accordingly, the controller 52 may determine that the temperature of the catalyst 31 is higher as the degree of deterioration of the catalyst 31 is higher, even when the degree of purification of the exhaust gas by the catalyst 31 is the same.

After Step S205, the controller 52 may determine, in Step S206, whether the temperature of the catalyst 31 is lower than a threshold value.

The threshold value used in Step S206 may be set to a value based on which the determination is made as to whether the catalyst 31 is high enough in temperature to effectively exhibit the purification effect on the exhaust gas. In some embodiments, the threshold value used in Step S206 may be set to a value corresponding to the lowest value within a temperature range in which the purification effect of the catalyst 31 on the exhaust gas is exhibited in a desired manner.

If the temperature of the catalyst 31 is determined to be lower than the threshold value (Step S206: YES), the process flow may proceed to Step S207. In contrast, if the temperature of the catalyst 31 is higher than or equal to the threshold value (Step S206: NO), the process flow illustrated in FIG. 5 may end.

If the temperature of the catalyst 31 is determined to be lower than the threshold value (Step S206: YES), the controller 52 may execute the warming control in Step S207, following which the process flow illustrated in FIG. 5 may end. As described above, the warming control may be the control that warms up the catalyst 31.

In some embodiments, the controller 52 may change the ignition timing of the ignition plug 14 to a lag side in the warming control, compared with that in the time when the warming control is not executed. This increases the temperature inside the combustion chamber 13 at a timing when the exhaust valve 17 opens, and causes the exhaust gas at high temperature to be discharged from the combustion chamber 13 into the exhaust flow passage 30. The high-temperature exhaust gas supplied to the catalyst 31 may warm up the catalyst 31.

In some embodiments, the controller 52 may increase the amount of fuel injection through the fuel injection valve 15 in the warming control, compared with that in the time when the warming control is not executed. This increases a burning temperature inside the combustion chamber 13 and causes the exhaust gas at high temperature to be discharged from the combustion chamber 13 into the exhaust flow passage 30. The high-temperature exhaust gas supplied to the catalyst 31 may warm up the catalyst 31.

In some embodiments, the controller 52 may change both the ignition timing and the amount of fuel injection in the warming control, from those in the time when the warming control is not executed. This allows the catalyst 31 to be warmed up more appropriately. In some embodiments, the controller 52 may change one of the ignition timing and the fuel injection amount in the warming control, from that in the time when the warming control is not executed.

According to the present example embodiment described above, before the engine 10 is started up, the controller 52 may execute the scavenging control that causes the exhaust gas remaining in the engine 10 and the exhaust flow passage 30 to flow to pass through the catalyst 31 before being discharged. In addition, the controller 52 may execute the warming control that warms up the catalyst 31, based on the degree of purification of the exhaust gas by the catalyst 31 during the execution of the scavenging control. This allows the catalyst 31 to be warmed up taking into consideration the temperature of the catalyst 31 estimated based on the degree of purification of the exhaust gas by the catalyst 31 that has been appropriately identified. This helps to prevent the catalyst 31 having not been sufficiently decreased in temperature from being unnecessarily warmed up, for example. It is therefore possible to warm up the catalyst 31 at an appropriate timing, which helps to prevent the environmental performance or fuel efficiency from deteriorating.

According to one possible method of estimating the temperature of the catalyst 31, the temperature of the catalyst 31 can be estimated based on the temperature of cooling water of the engine 10, for example. However, a relation between the cooling water of the engine 10 and the temperature of the catalyst 31 can change depending on various factors. Thus, if the temperature of the catalyst 31 is estimated based on the temperature of the cooling water of the engine 10, the estimated temperature of the catalyst 31 can be lower than an actual temperature of the catalyst 31, which can result in unnecessary warming-up of the catalyst 31. In contrast, according to the method disclosed in the present example embodiment, the catalyst 31 may be warmed up taking into consideration the temperature of the catalyst 31 estimated based on the degree of purification of the exhaust gas by the catalyst 31. It is therefore possible to warm up the catalyst 31 at an appropriate timing.

The process to be performed by the control apparatus 50 has been described above with reference to FIGS. 3 to 6. Note that the above-described process to be performed by the control apparatus 50 may be modified.

In the above-described process flow illustrated in FIG. 3, the controller 52 may close both the on-off valve 32 and the throttle valve 23 after the engine 10 is stopped. In some embodiments, the controller 52 may close any one of the on-off valve 32 or the throttle valve 23 after the engine 10 is stopped. However, to effectively retain the exhaust gas in the engine 10 and the exhaust flow passage 30, the controller 52 may close both the on-off valve 32 and the throttle valve 23 after the engine 10 is stopped. When the controller 52 is configured to close only the throttle valve 23 after the engine 10 is stopped, the on-off valve 32 may be removed from the intake and exhaust system 1.

In some embodiments, the above-described process flow illustrated in FIG. 3 may not be performed after the engine 10 is stopped. In other words, the controller 52 may perform neither the process of closing the on-off valve 32 nor the process of closing the throttle valve 23 after the engine 10 is stopped. In this case, the efficiency in retaining the exhaust gas in the engine 10 and the exhaust flow passage 30 may decrease, but part of the exhaust gas may be retained in the engine 10 and the exhaust flow passage 30 before the engine 10 is started up. Accordingly, the degree of purification of the exhaust gas by the catalyst 31 may be identified by executing the scavenging control before the engine 10 is started up. When the controller 52 is configured to perform neither the process of closing the on-off valve 32 nor the process of closing the throttle valve 23 after the engine 10 is stopped, the on-off valve 32 may be removed from the intake and exhaust system 1.

In the example embodiment described above, the catalyst 31 may be a nitrogen oxide occlusion catalyst. However, the catalyst 31 is not limited to the nitrogen oxide occlusion catalyst. In some embodiments, the catalyst 31 may be a ternary catalyst. The ternary catalyst may oxidize hydrocarbon (HC) and carbon monoxide (CO) in the exhaust gas and reduce NOx in the exhaust gas to thereby purify these harmful compositions into harmless water vapor ($H_2O$), carbon dioxide ($CO_2$), and nitride ($N_2$). In this case also, in Step S204 in FIG. 5, the controller 52 may identify the degree of purification of the exhaust gas by the catalyst 31 during the execution of the scavenging control, based on the results of detection by the first exhaust gas sensor 33 and the second exhaust gas sensor 34, for example. In some embodiments, the first exhaust gas sensor 33 and the second exhaust gas sensor 34 may detect the concentration of NOx in the exhaust gas, or the concentration of compositions such as oxygen other than NOx in the exhaust gas.

In the above-described process flow illustrated in FIG. 5, for example, the controller 52 may estimate the temperature of the catalyst 31, based on the result of identification of the degree of purification of the exhaust gas by the catalyst 31, and execute the warming control, based on the result of estimation of the temperature of the catalyst 31. However, the controller 52 may not estimate the temperature of the catalyst 31. In some embodiments, the controller 52 may determine whether the warming control is to be executed, directly based on the result of identification of the degree of purification of the exhaust gas by the catalyst 31 without estimating the temperature of the catalyst 31.

Some effects of the intake and exhaust system 1 according to the example embodiment of the disclosure will now be described.

In the intake and exhaust system 1 according to the example embodiment of the disclosure, the processor 50a executes before the engine 10 is started up, the scavenging control that causes the exhaust gas remaining in the engine 10 and the exhaust flow passage 30 to flow to pass through the catalyst 31 before being discharged, and executes, before the engine 10 is started up, the warming control that warms up the catalyst 31, based on the degree of purification of the exhaust gas by the catalyst 31 during the execution of the scavenging control. This allows the catalyst 31 to be warmed up taking into consideration the temperature of the catalyst 31 estimated based on the degree of purification of the exhaust gas by the catalyst 31 that has been appropriately identified. This helps to prevent the catalyst 31 having not been sufficiently decreased in temperature from being unnecessarily warmed up, for example. It is therefore possible to warm up the catalyst 31 at an appropriate timing, which helps to prevent the environmental performance or fuel efficiency from deteriorating.

In some embodiments, the intake and exhaust system 1 may include the on-off valve 32 disposed in the exhaust flow passage 30, and the processor 50a may close the on-off valve 32 after the engine 10 is stopped and execute the scavenging control after the on-off valve 32 is opened and before the engine 10 is started up. This allows the exhaust gas to be appropriately retained in the engine 10 and the exhaust flow passage 30 after the engine 10 is stopped. This increases the amount of exhaust gas flowing to pass through the catalyst 31 in the scavenging control, and allows the degree of purification of the exhaust gas by the catalyst 31 to be identified at higher accuracy.

In some embodiments, the processor 50a of the intake and exhaust system 1 may close the throttle valve 23 after the engine 10 is stopped and execute the scavenging control after the throttle valve 23 is opened and before the engine 10 is started up. This appropriately causes the exhaust gas to remain in the engine 10 and the exhaust flow passage 30 after the engine 10 is stopped, which increases the amount of exhaust gas flowing to pass through the catalyst 31 in the scavenging control, and allows the degree of purification of the exhaust gas by the catalyst 31 to be identified at higher accuracy.

In some embodiments, the intake and exhaust system 1 may include the starter motor 40. The processor 50a may cause the exhaust gas remaining in the engine 10 and the exhaust flow passage 30 to flow to pass through the catalyst 31 before being discharged by driving the starter motor 40 in the scavenging control. This appropriately causes the exhaust gas remaining in the engine 10 and the exhaust flow passage 30 to flow to pass through the catalyst 31 before being discharged in the scavenging control.

In some embodiments, the intake and exhaust system 1 may include the electric compressor 22 disposed in the intake flow passage 20. The processor 50a may cause the exhaust gas remaining in the engine 10 and the exhaust flow passage 30 to flow to pass through the catalyst 31 before being discharged by driving the electric compressor 22 in the scavenging control. This appropriately causes the exhaust gas remaining in the engine 10 and the exhaust flow passage 30 to flow to pass through the catalyst 31 before being discharged in the scavenging control.

It should be appreciated that the foregoing example embodiments of the disclosure are mere examples and are not intended to limit the scope of the disclosure. It should be also appreciated that various omissions, replacements, and modifications may be made in the foregoing example embodiments described herein, without departing from the scope of the disclosure. The disclosure is intended to include such modifications and alterations in so far as they fall within the scope of the appended claims or the equivalents thereof.

For example, the processes described herein with reference to the flowcharts are not necessarily executed in the orders illustrated in the flowcharts. Other steps may be added or some of the steps of the processes may be omitted.

As used in this specification and the appended claims, the singular forms "a", "an", and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term "substantially", "approximately", "about", and its variants having the similar meaning thereto are defined as being largely but not necessarily wholly what is specified as understood by one of ordinary skill in the art.

The term "disposed on/provided on/formed on" and its variants having the similar meaning thereto as used herein refer to elements disposed directly in contact with each other or indirectly by having intervening structures therebetween.

According to the foregoing example embodiments of the disclosure, it is possible to warm up the catalyst at an appropriate timing.

The invention claimed is:

1. An intake and exhaust system comprising:
an engine;
an exhaust flow passage coupled to the engine;
a catalyst disposed in the exhaust flow passage and configured to purify exhaust gas; and
a control apparatus comprising
one or more processors, and
one or more memories coupled to the one or more processors, wherein
the one or more processors are configured to
before the engine is started up, execute scavenging control that causes
the exhaust gas remaining in the engine and the exhaust flow passage to flow to pass through the catalyst before being discharged, and
identify a degree of purification of the exhaust gas by the catalyst, and
before the engine is started up, execute warming control that warms up the catalyst, based on the identified degree of purification of the exhaust gas by the catalyst during execution of the scavenging control,
the intake and exhaust system further comprising
an on-off valve disposed in the exhaust flow passage, and
a throttle valve disposed in an intake flow passage coupled to the engine, wherein
the one or more processors are configured to
after the engine is stopped, close the on-off valve and the throttle valve to cause the exhaust gas to stay in the engine and the exhaust flow passage, to increase an amount of the exhaust gas to flow to pass through the catalyst during the scavenging control.

2. An intake and exhaust system comprising
an engine;
an exhaust flow passage coupled to the engine;
a catalyst disposed in the exhaust flow passage and configured to purify exhaust gas; and
a control apparatus comprising
one or more processors, and
one or more memories coupled to the one or more processors, wherein
the one or more processors are configured to
before the engine is started up, execute scavenging control that causes the exhaust gas remaining in the engine and the exhaust flow passage to flow to pass through the catalyst before being discharged, and
before the engine is started up, execute warming control that warms up the catalyst, based on a degree of purification of the exhaust gas by the catalyst during execution of the scavenging control, the intake and exhaust system further comprising an on-off valve disposed in the exhaust flow passage, wherein the one or more processors are further configured to close the on-off valve after the engine is stopped, and execute the scavenging control after the on-off valve is opened and before the engine is started up.

3. The intake and exhaust system according to claim 2, further comprising a starter motor coupled to the engine, wherein the one or more processors are configured to cause the exhaust gas remaining in the engine and the exhaust flow passage to flow to pass through the catalyst before being discharged by driving the starter motor in the scavenging control.

4. The intake and exhaust system according to claim 2, further comprising:

an intake flow passage coupled to the engine; and an electric compressor disposed in the intake flow passage, wherein the one or more processors are configured to cause the exhaust gas remaining in the engine and the exhaust flow passage to flow to pass through the catalyst before being discharged by driving the electric compressor in the scavenging control.

5. The intake and exhaust system according to claim 2, further comprising a throttle valve disposed in an intake flow passage coupled to the engine, the one or more processors are configured to after the engine is stopped, close the on-off valve and the throttle valve to cause the exhaust gas to stay remained in the engine and the exhaust flow passage, to increase an amount of the exhaust gas to flow to pass through the catalyst during the scavenging control.

6. The intake and exhaust system according to claim 2, the one or more processors are configured to identify a degree of purification of the exhaust gas by the catalyst.

7. The intake and exhaust system according to claim 6, the one or more processors are configured to estimate a temperature of the catalyst based on the identified degree of purification of the exhaust gas by the catalyst, determine whether the temperature is lower than a predetermined threshold, and in response to the temperature being lower than the predetermined threshold, execute the warming control.

8. The intake and exhaust system according to claim 7, wherein the predetermined threshold is set based on a temperature range in which a purification effect of the catalyst on the exhaust gas is exhibited in a desired manner.

9. The intake and exhaust system according to claim 1, further comprising a starter motor coupled to the engine, wherein the one or more processors are configured to cause the exhaust gas remaining in the engine and the exhaust flow passage to flow to pass through the catalyst before being discharged by driving the starter motor in the scavenging control.

10. The intake and exhaust system according to claim 1, further comprising:

an intake flow passage coupled to the engine; and an electric compressor disposed in the intake flow passage, wherein the one or more processors are configured to cause the exhaust gas remaining in the engine and the exhaust flow passage to flow to pass through the catalyst before being discharged by driving the electric compressor in the scavenging control.

11. The intake and exhaust system according to claim 1, the one or more processors are configured to estimate a temperature of the catalyst based on the identified degree of purification of the exhaust gas by the catalyst, determine whether the temperature is lower than a predetermined threshold, and in response to the temperature being lower than the predetermined threshold, execute the warming control.

12. The intake and exhaust system according to claim 11, wherein the predetermined threshold is set based on a temperature range in which a purification effect of the catalyst on the exhaust gas is exhibited.

13. An intake and exhaust system comprising:

an engine;

an exhaust flow passage coupled to the engine;

a catalyst disposed in the exhaust flow passage and configured to purify exhaust gas; and a control apparatus comprising one or more processors, and one or more memories coupled to the one or more processors, wherein the one or more processors are configured to before the engine is started up, execute scavenging control that causes the exhaust gas remaining in the engine and the exhaust flow passage to flow to pass through the catalyst before being discharged, and before the engine is started up, execute warming control that warms up the catalyst, based on a degree of purification of the exhaust gas by the catalyst during execution of the scavenging control, the intake and exhaust system further comprising:

an intake flow passage coupled to the engine; and a throttle valve disposed in the intake flow passage, wherein the one or more processors are further configured to close the throttle valve after the engine is stopped, and execute the scavenging control after the throttle valve is opened and before the engine is started up.

14. The intake and exhaust system according to claim 13, further comprising a starter motor coupled to the engine, wherein the one or more processors are configured to cause the exhaust gas remaining in the engine and the exhaust flow passage to flow to pass through the catalyst before being discharged by driving the starter motor in the scavenging control.

15. The intake and exhaust system according to claim 13, further comprising:

an intake flow passage coupled to the engine; and an electric compressor disposed in the intake flow passage, wherein the one or more processors are configured to cause the exhaust gas remaining in the engine and the exhaust flow passage to flow to pass through the catalyst before being discharged by driving the electric compressor in the scavenging control.

16. The intake and exhaust system according to claim 13, the one or more processors are configured to identify a degree of purification of the exhaust gas by the catalyst.

17. The intake and exhaust system according to claim 16, the one or more processors are configured to
  estimate a temperature of the catalyst based on the identified degree of purification of the exhaust gas by the catalyst,
  determine whether the temperature is lower than a predetermined threshold, and
  in response to the temperature being lower than the predetermined threshold, execute the warming control.

18. The intake and exhaust system according to claim 17, wherein the predetermined threshold is set based on a temperature range in which a purification effect of the catalyst on the exhaust gas is exhibited in a desired manner.

* * * * *